Grier & Boyd.
Making Augers.
No. 2,712. Reissued Aug. 6, 1867.
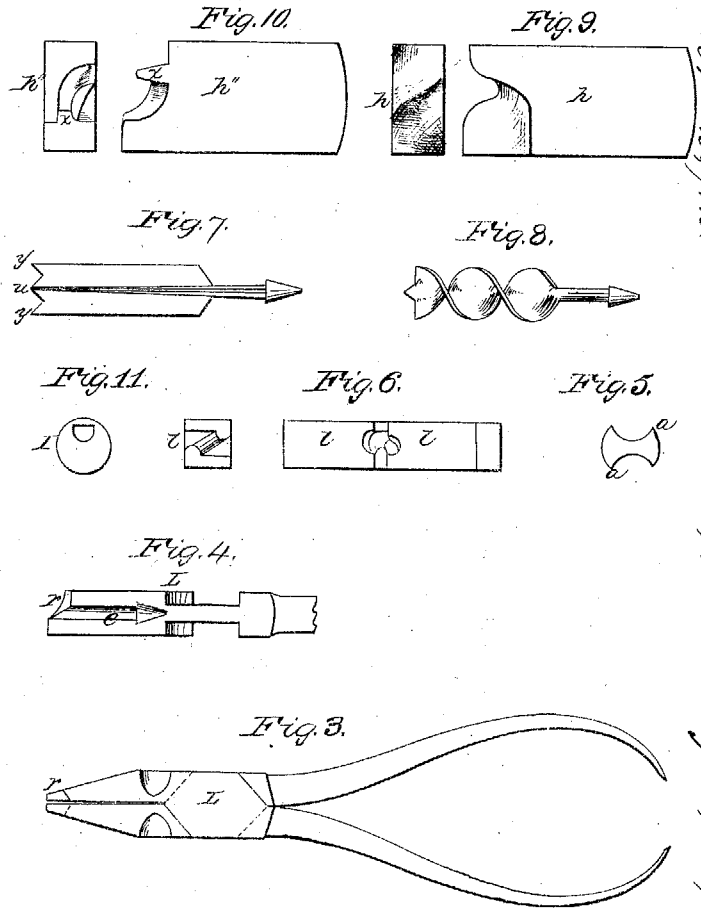
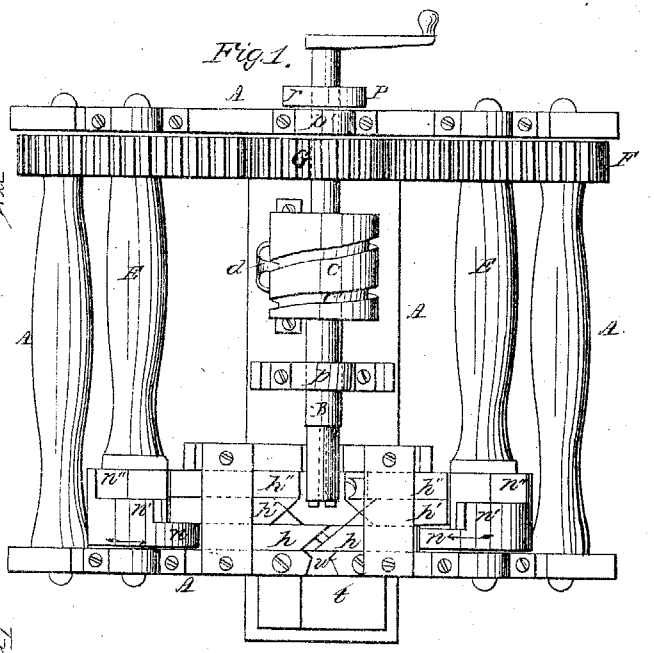
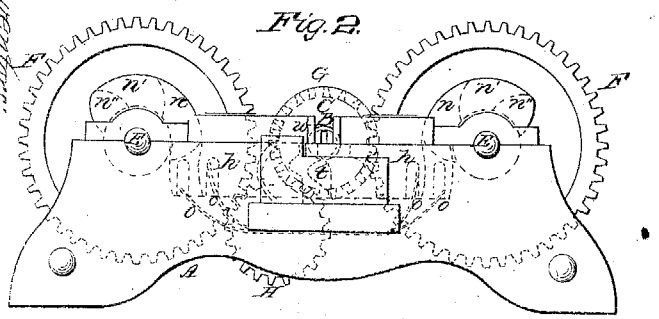
Witnesses:
R. C. Lowry
Wm. L. Lowry
Inventors:
A. H. Grier & Jas. Dodge of Illinois
R. H. Boyd
their Attys.
THE GRAPHIC CO. PHOTO-LITH. 39 & 41 PARK PLACE, N.Y.

United States Patent Office.

WILLIAM W. GRIER AND ROBERT H. BOYD, OF HULTON, PENNSYLVANIA.

*Letters Patent No.* 54,893, *dated May* 22, 1866; *reissue No.* 2,712, *dated August* 6, 1867.

IMPROVED MACHINE FOR MAKING AUGERS.

The Schedule referred to in these Letters Patent and making part of the same.

TO ALL WHOM IT MAY CONCERN:

Be it known that we, W. W. GRIER and ROBERT H. BOYD, of Hulton, in the county of Allegheny, and State of Pennsylvania, have invented a new and improved Machine for the Manufacture of Augers, Bits, and Twist-Drills; and we do hereby declare that the following is a clear, full, and exact description thereof, reference being had to the accompanying drawings, making part of this specification, and to the letters of reference marked thereon.

Our invention has for its object the twisting of augers, bits, and twist-drills in a rapid and uniform manner by a novel mode of operation, which consists in giving the twist to the blank by a rotary and longitudinal motion, so proportioned the one to the other as that the instrument which gives the twist shall travel on the blank, or *vice versa*, according to the intended pitch of the twist, and also in combination therewith two or more pairs of dies, of a form to fit the twist, which dies are caused to approach in succession and gripe the blank as the twist progresses, and thus preserve the form which has been given. In the drawings—

Figure 1 is a top plan view of our machine.

Figure 2 is a front elevation of the same.

Figures 3, 4, 5, 6, 7, 8, 9, 10, and 11 represent portions of the machine shown in detail, together with the auger-blanks and other devices to be used in connection with the machine, as hereinafter explained.

In building our improved machine we first provide a frame, A, of any suitable size and form, and mount thereon a mandrel, B, as shown in fig. 1. This mandrel has a hole of proper form and size to receive the auger-blank endwise, extending into it longitudinally far enough to permit the insertion of that portion of the blank that is intended to be twisted, said hole being shown in the end of the mandrel B, in fig. 2, and indicated by the dotted lines in fig. 1. The front portion of the mandrel is supported by the bearing *p*, fig. 1, while its rear end passes through a sleeve or tubular journal, P, to which it is connected by a feather or spline in such a manner as to cause the mandrel and the sleeve P to rotate together, and yet permit the mandrel B to move longitudinally in the sleeve P. Upon the outer end of the sleeve P is a collar, *r*, and upon its inner end is secured firmly a spur-wheel, G, which latter imparts motion to other parts of the machine, as hereinafter explained. A cylindrical boss, C, is secured firmly upon the mandrel B, and has a cam groove cut in its periphery, as represented in fig. 1, which receives and travels on a stud, *d*, attached to the frame A, and thereby imparts to the mandrel a longitudinal movement whenever the latter is rotated, the rapidity or degree of said longitudinal movement in proportion to the rotating motion of the mandrel being regulated by the pitch of the cam groove C. Upon the frame A and parallel with the mandrel B are mounted two rotating shafts E, one on each side of the mandrel, as shown in fig. 1. Upon the rear end of these shafts are secured spur-wheels F, one of which engages directly with the wheel G, and the other engaging with wheel H, which latter wheel also engages with wheel G, by which means motion is imparted by wheel G to both of the shafts E, the latter, however, by the interposition of wheel H, being made to revolve in opposite directions. The front ends of the shafts E have secured to them a series of cams, arranged to come into successive operation at regular intervals, as represented by *n n'* and *n''* of figs. 1 and 2, and corresponding with the progress of the twist. On each side of the mandrel B, and between it and the cams above mentioned, is located a series of dies, *h h'* and *h''*, said dies resting on suitable bearings, and arranged to slide to and fro transversely on the frame A, as shown in fig. 1. The inner ends of these dies are so shaped as to correspond with the sides of the auger when twisted, a side and end view of the die being shown at fig. 9. The arrangement of the cams on the shafts E is such that as said shafts rotate, the cam *n* on each shaft will strike the corresponding dies *h*, and simultaneously move them toward each other, and so on with each pair of the dies in succession; the next pair *h'* being operated by the cams *n'*, and the dies *h''* by the cams *n''*, the number of the dies and cams being more or less according to the number of twists to be given to the blank. The form of the cams is such as to move the dies and cause them to clasp the blank when the twist has been given, and then hold them until the entire twist shall have been completed, and then permit the dies to be forced back by springs O, represented by dotted lines in fig. 2, and as the twist is given progressively, the series of cams is set so as to operate the dies as the twist progresses. The cam groove in the boss C, by which the longitudinal movements of the mandrel B are regulated, beginning at the front, extends for a short distance around the boss C, without any inclination from a right angle to the axis of the mandrel to start the twist, and then it continues as a true helix as far as may be necessary to produce the required longitudinal movement of the mandrel B, depending upon the length of the twist, and then for a short distance, as at C′, it is of less inclination, to give a shorter twist at the end where the cutting edges are formed.

It will thus be seen that the mandrel will make a partial revolution before commencing its backward movement, and will also make a partial revolution with a less receding motion at the end of the twisting operation, the object of which will be presently explained.

We then provide a pair of tongs or holder for holding the blank while being twisted by the machine. These tongs may be constructed as shown in figs. 3 and 4. The inner face of each jaw has a recess formed in it of a size and form corresponding with the head and shank of the blank, as shown at *e*, fig. 4, which represents one of the jaws detached. Each of the jaws has its front end cut away, as shown at *r*, and curved to correspond with the twist to be given to the blank, the two jaws of the tongs thus constituting a pair of dies corresponding to the first half twist of the blank. It will be observed that the last pair of the dies in the series, represented by *h″*, differs somewhat from the others, as shown in fig. 10. These are each provided with a projection, *x*, which serves to set the lips on the blank at the end of the twisting operation and before the blank is removed.

The operation is as follows: A blank is first formed of the requisite size, by any of the usual processes, of the form represented in fig. 7, the central projecting point *u* being intended for forming the screw-point of the auger or bit when completed, and the projecting points *y* forming the lips of the same. This blank thus prepared is first heated, then seized by the shank with the tongs L, and the other end thrust endwise into the hole or recess in the end of the mandrel B, the latter at the time being moved forward as far as possible, and the dies being all opened or drawn back. When the blank is thus inserted in the mandrel the tongs will rest in the notch *w* in the front end of the frame A, which notch being made of proper size and form to receive the tongs will hold them firmly in place and prevent their being turned over or opened. Motion is then imparted to the mandrel B, which makes a partial revolution, thereby giving a half twist to that portion of the blank at the end of the tongs, the curved portion *r* of which operates as a die to make said twist regular and true, and also to hold it after it has been thus twisted, and prevent it from being still more twisted. The mandrel is then moved backward by the helical part of the cam groove, and continues to rotate regularly to give the required twist. In the mean time the rotation of the shafts E will have brought the cams *n* in contact with the first pair of dies *h*, causing them to close upon the blank as soon as the end of the mandrel shall have receded far enough to permit them to move; and thus while the twisting of the blank is effected by the rotation of the mandrel, at the same time, as fast as the twisting is accomplished, the dies are forced into contact with and made to hold the twisted portion, by which means it is both pressed into a true and regular form, and prevented from being further twisted, as it would be, if not thus held; and towards the end the part *c′* of the cam groove retards the back movement of the mandrel while the rotary motion continues, by which the points *y* of the blank are brought in contact with the projections *x* on the dies *h″*, which sets them, that is to say, they are bent so as to stand at a less angle than the rest of the twist. When removed from the machine at this stage of the proceeding the blank will have assumed the form represented in fig. 8, and will then be ready for the finishing processes, which consist in cutting the screw on the point, filing up the lips, and polishing.

Our improved machine is adapted to the twisting of all styles of augers, bits, and twist-drills, the mandrel and dies only being changed, for different styles and sizes. For twisting that kind of augers and bits which have their bodies twisted spirally, like a cork-screw, the hole in the end of the mandrel will be made of the form represented in fig. 11, fig. 6 representing the style of dies to be used therewith. To make twist-drills the blank will be forged or prepared in the form represented in fig. 5, in which *a a* represent the cutting edges, the mandrel, of course, being provided with a hole corresponding in form to that of the cross-section of the blank, and properly formed dies being provided. When the twist in some portion of the length is to be of a different pitch or inclination from other portions, as in the example first described, it will be obvious that the blank must be stationary, while the mandrel which gives the twist must rotate and recede, because the end when the twist is reduced could not fit and pass between the other dies; but when the twist is to be uniform, as in making twist-drills, it will be obvious that it is immaterial whether the tongs with the blank be stationary, and the mandrel or twister be made to rotate and recede from the tongs, or the mandrel be held stationary and the tongs or holder with the blank be made to rotate and recede from the mandrel, the series of pairs of dies in both instances being brought successively into action.

Having thus described our invention, we claim as new, and desire to secure by Letters Patent—

The means substantially as herein described for twisting the blank, in combination with the series of dies, for clasping and holding the twist as it progresses, substantially as and for the purpose described.

And we also claim the means by which the twist is given to the blank, and which consists of the combination of the instrument, having an aperture of the form of a cross-section of the blank which slides on the blank, the holder to hold the blank or the equivalent thereof, and the mechanism, or the equivalent thereof, for imparting simultaneously a longitudinal and a rotary motion, the combination having a mode of operation substantially such as hereinabove set forth.

WILLIAM W. GRIER,
ROBERT H. BOYD.

Witnesses:
JAMES M. TAYLOR,
J. A. CARLINE.